(12) United States Patent
Miyai

(10) Patent No.: US 10,863,043 B2
(45) Date of Patent: Dec. 8, 2020

(54) IMAGE FORMING APPARATUS FOR FORMING IMAGE ON RECORDING SHEET

(71) Applicant: KYOCERA Document Solutions Inc., Osaka (JP)

(72) Inventor: Toshiya Miyai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/726,563

(22) Filed: Dec. 24, 2019

(65) Prior Publication Data

US 2020/0213459 A1 Jul. 2, 2020

(30) Foreign Application Priority Data

Dec. 28, 2018 (JP) ................................. 2018-248501

(51) Int. Cl.
*H04N 1/00* (2006.01)
*G06F 40/263* (2020.01)

(52) U.S. Cl.
CPC ....... *H04N 1/00498* (2013.01); *G06F 40/263* (2020.01); *H04N 1/0097* (2013.01); *H04N 1/00331* (2013.01); *H04N 2201/0094* (2013.01)

(58) Field of Classification Search
CPC ............ H04N 1/00498; H04N 1/00331; G06F 40/263
See application file for complete search history.

(56) References Cited

U.S. PATENT DOCUMENTS

| | | | | |
|---|---|---|---|---|
| 2003/0099374 | A1* | 5/2003 | Choi | H04N 1/32101 382/100 |
| 2004/0210444 | A1* | 10/2004 | Arenburg | G10L 15/005 704/277 |
| 2005/0058485 | A1* | 3/2005 | Horii | B41J 3/4075 400/76 |
| 2005/0162679 | A1* | 7/2005 | Iguchi | G03G 15/5016 358/1.13 |
| 2006/0215198 | A1* | 9/2006 | Yorimoto | H04N 1/32523 358/1.13 |
| 2009/0083729 | A1* | 3/2009 | Kanai | G06F 9/4411 717/174 |

(Continued)

FOREIGN PATENT DOCUMENTS

JP H11-3193 A 1/1999

*Primary Examiner* — Ted W Barnes
(74) *Attorney, Agent, or Firm* — IP Business Solutions, LLC

(57) ABSTRACT

An image forming apparatus includes: an image forming device forming an image indicated by print data on a recording sheet; and a control device including a processor and functioning, through the processor executing a control program, as a controller configured to: extract text contained in the print data to determine a kind of a language of the text extracted; determine, for each determined kind of the language, whether to record the text consisting of the language of the determined kind; and when determining that the text is to be recorded, cause the image forming device to image form the text consisting of the language of the determined kind on the recording sheet, and, when determining that the text is not to be recorded, not to cause the image forming device to image form the text consisting of the language of the determined kind on the recording sheet.

9 Claims, 12 Drawing Sheets

(56) References Cited

U.S. PATENT DOCUMENTS

| | | | |
|---|---|---|---|
| 2010/0250233 A1* | 9/2010 | Tanaka | G06F 3/1208 704/3 |
| 2012/0263380 A1* | 10/2012 | Terao | H04N 1/0048 382/182 |
| 2014/0268246 A1* | 9/2014 | Ohguro | H04N 1/00506 358/403 |
| 2020/0175345 A1* | 6/2020 | Itogawa | G06K 15/1885 |

* cited by examiner

Fig.3

| LANGUAGE | DISPLAY FREQUENCY (CUMULATIVE TIME) | PRIORITY LEVEL |
|---|---|---|
| ENGLISH | 82.4%(180:30) | 10 |
| JAPANESE | 11.4%(25:00) | 8 |
| SPANISH | 5.5%(12:00) | 2 |
| FRENCH | 0.7%(1:30) | 1 |
| | | |

Fig.7A

UNITED KINGDOM IS A WONDERFUL COUNTRY.
UNITED KINGDOM IS A WONDERFUL COUNTRY.
UNITED KINGDOM IS A WONDERFUL COUNTRY.
UNITED KINGDOM IS A WONDERFUL COUNTRY.

日本は素晴らしい国です。日本は素晴らしい国です。日本は素晴らしい国です。日本は素晴らしい国です。

LA FRANCE EST UN PAYS MERVEILLEUX.
LA FRANCE EST UN PAYS MERVEILLEUX.
LA FRANCE EST UN PAYS MERVEILLEUX.
LA FRANCE EST UN PAYS MERVEILLEUX.

ESPAÑA ES UN PAÍS MARAVILLOSO.
ESPAÑA ES UN PAÍS MARAVILLOSO.
ESPAÑA ES UN PAÍS MARAVILLOSO.
ESPAÑA ES UN PAÍS MARAVILLOSO.

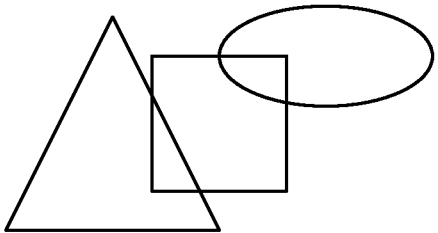

UNITED KINGDOM IS A WONDERFUL COUNTRY.
UNITED KINGDOM IS A WONDERFUL COUNTRY.
UNITED KINGDOM IS A WONDERFUL COUNTRY.
UNITED KINGDOM IS A WONDERFUL COUNTRY.

| LANGUAGE | IMAGE FORMATION FREQUENCY (NUMBER OF SHEETS RECORDED) | PRIORITY LEVEL |
|---|---|---|
| ENGLISH | 41.7%(100) | 10 |
| JAPANESE | 41.7%(100) | 10 |
| SPANISH | 16.7%(40) | 3 |
| FRENCH | 0.0%(0) | 0 |
| | | |

Fig.11

| LANGUAGE | DISPLAY FREQUENCY (CUMULATIVE TIME) | PRIORITY LEVEL | TO BE PRINTED |
|---|---|---|---|
| ENGLISH | 82.4%(180:30) | 10 | ○ |
| JAPANESE | 11.4%(25:00) | 8 | |
| SPANISH | 5.5%(12:00) | 2 | ○ |
| FRENCH | 0.7%(1:30) | 1 | |
| ⋮ | ⋮ | ⋮ | ⋮ |

IMAGE FORMING APPARATUS FOR FORMING IMAGE ON RECORDING SHEET

INCORPORATION BY REFERENCE

This application claims priority to Japanese Patent Application No. 2018-248501 filed on Dec. 28, 2018, the entire contents of which are incorporated by reference herein.

BACKGROUND

The present disclosure relates to an image forming apparatus for forming an image on a recording sheet, and in particular to a technique for selecting text of a specific language from a plurality of kinds of text included in an image, and forming the selected text on the recording sheet.

There is an image forming apparatus that generates, inputs, or receives print data (such as PDF data and image data), and forms and outputs, on a recording sheet, text, a picture, a figure and the like indicated by the print data. In a generally used printer, it is arranged that an error is detected by checking a character code to be printed included in a page description language. With this arrangement, if an instruction to print characters is sent in replace of an instruction to print images and the image data is interpreted as the character code, the error is detected and a situation where a large amount of meaningless characters being printed is prevented.

SUMMARY

A technique improved over the aforementioned technique is proposed as one aspect of the present disclosure.

An image forming apparatus according to an aspect of the present disclosure includes an image forming device and a control device. The image forming device forms an image indicated by print data on a recording sheet. The control device includes a processor and functions, through the processor executing a control program, as a controller. The controller is configured to: extract text contained in the print data to determine a kind of a language of the text extracted; determine, for each determined kind of the language, whether to record the text consisting of the language of the determined kind; and when it is determined that the text is to be recorded, cause the image forming device to image form the text consisting of the language of the determined kind on the recording sheet, and, when it is determined that the text is not to be recorded, not to cause the image forming device to image form the text consisting of the language of the determined kind on the recording sheet.

BRIEF DESCRIPTION OF THE DRAWINGS

FIG. 3 is a table showing a display frequency of each kind of language displayed on a graphical user interface during operation of the image forming apparatus.

FIG. 7A is a view showing each text in English, Japanese, French, and Spanish, and an image, that are all indicated by print data.

FIG. 9 is a table including an image formation frequency of image forming of each kind of language to the recording sheet.

FIG. 11 is a table showing the display frequency, a priority level, and printing necessity for various kinds of language.

DETAILED DESCRIPTION

Hereinafter, a description will be given of one embodiment of the present disclosure with reference to the drawings.

Figure 1:
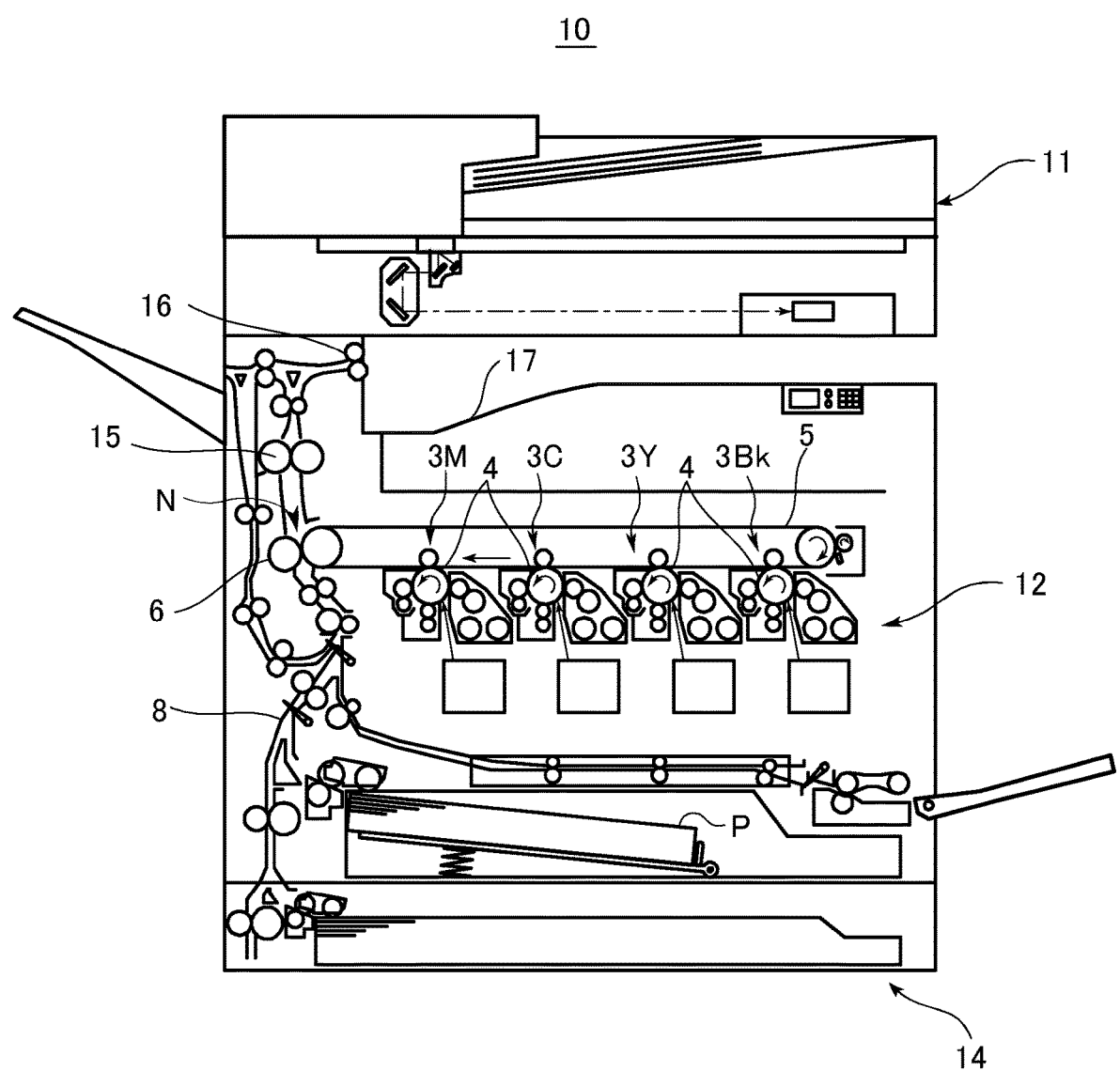
FIG. 1 is a cross-sectional view showing one embodiment of an image forming apparatus according to the present disclosure.

FIG. 1 is a cross-sectional view showing the one embodiment of an image forming apparatus according to the present disclosure. An image forming apparatus 10 shown in FIG. 1 is, for example, a multifunction peripheral (MFP) configured to execute a plurality of functions including a copying function, a printing function, and a scanning function. The image forming apparatus 10 includes an image reading device 11 and an image forming device 12.

The image reading device 11 includes an image pickup device that optically reads an image of a source document. An analog output from the image pickup device is converted into a digital signal, from which image data constituting the image of the source document is generated.

The image forming device 12 is configured to form the image indicated by the image data on a recording sheet, and includes an image forming unit 3M for magenta, an image forming unit 3C for cyan, an image forming unit 3Y for yellow, and an image forming unit 3Bk for black. In each of the image forming units 3M, 3C, 3Y, and 3Bk, a surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5, as primary transfer. Thus, the color toner image is formed on the intermediate transfer roller 5. The color toner image is transferred, as secondary transfer, to a recording sheet P transported along a transport route 8 from a paper feed unit 14, at a nip region N defined between the intermediate transfer roller 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller pair 16.

Figure 2:
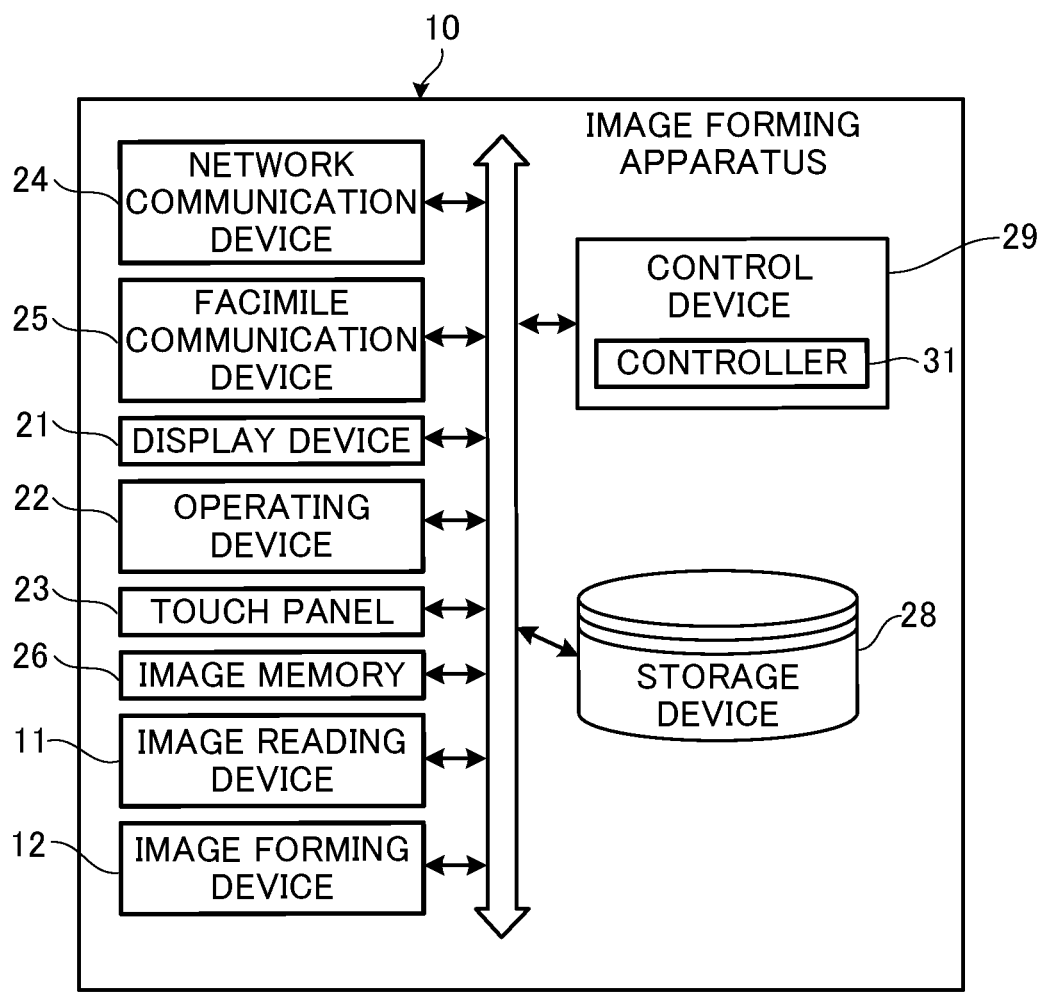
FIG. 2 is a block diagram showing a main internal configuration of the image forming apparatus according to the present embodiment.

Hereunder, the configuration related to the control of the image forming apparatus 10 will be described. FIG. 2 is a block diagram showing a main internal configuration of the image forming apparatus 10. As shown in FIG. 2, the image forming apparatus 10 includes the image reading device 11, the image forming device 12, a display device 21, an operating device 22, a touch panel 23, a network communication device 24, a facsimile communication device 25, an image memory 26, a storage device 28, and a control device 29. The mentioned components are configured to transmit and receive data or signals to and from each other, via a bus.

The display device 21 is a display device such as a liquid crystal display (LCD) and an organic light-emitting diode (OLED) display. The operating device 22 includes hard keys such as a numeric keypad, an enter key, and a start key.

The touch panel 23 is disposed on a screen of the display device 21. The touch panel 23 is a touch panel of a so-called resistive film type or electrostatic capacity type and detects touch of the touch panel 23 by, for example, a finger of a user together with a position of the aforementioned touch, and outputs a detection signal indicating the coordinates of the position of the touch to, for example, a controller 31 (to be described later) of the control device 29.

The network communication device 24 is connected to, for example, a personal computer (PC) and a server via a network NT, and performs data communication with the PC and the server.

The facsimile communication device 25 transmits and receives the image data to and from other image forming apparatus, a facsimile apparatus (not shown), and other such apparatus, via a network.

The image memory 26 temporarily stores, for example, the image data.

the storage device 28 a large-capacity storage medium such as a solid state drive (SSD) and a hard disk drive (HDD), and contains various application programs and various types of information.

The control device 29 is formed of a processor, a random access memory (RAM), a read only memory (ROM), and so on. The processor is, for example, a central processing unit (CPU), an application specific integrated circuit (ASIC), or a micro processing unit (n MPU). The control device 29 functions as the controller 31 through the processor executing a control program stored in the ROM or the storage device 28. The controller 31 of the control device 29, however, may be configured by a hardware circuit, instead of acting in accordance with the control program.

The controller 31 collectively controls the image forming apparatus 10. The control device 29 is connected to the display device 21, the operating device 22, the touch panel 23, the network communication device 24, the facsimile communication device 25, the image memory 26, the storage device 28, the image reading device 11, and the image forming device 12. The controller 31 controls operation of those components and performs transmission and reception of signals or data among those components.

The controller 31 serves a role as a processing unit that performs various processing required for image formation by the image forming apparatus 10. The controller 31 has a function of controlling a display operation of the display device 21. In addition, the controller 31 has a function of controlling the network communication device 24 and the facsimile communication device 25.

The operating device 22 and the touch panel 23 correspond to the operating device recited in Claims.

In the image forming apparatus 10 having the configurations as described above, when an image of a document is read by the image reading device 11, the controller 31 causes the image data indicating the image on the document to be temporarily stored in the image memory 26, then causes the image forming device 12 to form the image indicated by the image data on the recording sheet. Furthermore, when the image data is received at the facsimile communication device 25, the controller 31 causes the image data to be temporarily stored in the image memory 26, then causes the image forming device 12 to form the image indicated by the image data on the recording sheet. Alternatively, when the image data and the PDF data transmitted from an external terminal device is received by the network communication device 24, the controller 31 causes the image data and the PDF data to be temporarily stored in the image memory 26, then causes the image forming device 12 to form the image indicated by the image data and the PDF data on the recording sheet. Hereinafter, the image-indicating data, such as the image data and PDF data, will be referred to as "print data".

Based on an instruction to be inputted by an operation of the operating device 22 or the touch panel 23 by the user, the controller 31 sets, as an operation mode of the image forming apparatus 10, a language selection mode for performing language selection processing; in the language selection processing, depending on the kind of the language of the text, forming and not forming an image of that text on the recording sheet are switched.

In a condition where the aforesaid language selection function is set, the controller 31 extracts the text from the print data stored in the image memory 26, determines whether more than one kind of language (various kinds of language) is included in the text extracted, and, when determining that more than one kind of language is included, determines, for each kind of the language, whether to record text including the language (text range). When determining to record the text including the language, the controller 31 causes the image forming device 12 to form the text consisting of the language on the recording sheet. Furthermore, when determining not to record the text including the language, the controller 31 does not cause the image forming device 12 to form the text consisting of the language on the recording sheet. For example, when English, Japanese, French, and Spanish are determined as the languages included in the text, the controller 31 causes the image forming device 12 to form images of the text of English and the text of Japanese on the recording sheet, and not to form images of the text of French and the text of Spanish on the recording sheet.

To be specific, the storage device 28 stores an OCR program that executes a well-known OCR function for analyzing an image to be printed stored in the image memory 26 and for recognizing a character included in the image. When acting in accordance with the OCR program, the controller 31 extracts, as text, the character included in the image to be printed stored in the image memory 26. Furthermore, when the print data to be printed is a page description language, and a character code is included, the controller 31 also extracts a character shown by the character code as text.

The controller 31 then determines the kind of language included in the text extracted (details will be described later).

The storage device 28 stores, by each kind of the language, an image representing a graphical user interface (GUI) to be displayed on the display device 21. The controller 31 receives designation of an arbitrary language, the designation being inputted by the operation of the operating device 22 or the touch panel 23 by the user. The controller 31 reads out, from the storage device 28, the image of the GUI corresponding to the text including the arbitrary language the designation of which is received, and causes the display device 21 to display thereof.

With, for example a timer built in the control device 29, the controller 31 measures cumulative time that the GUI is displayed while the image forming apparatus 10 is running, by each kind of language. Then the controller 31 causes the storage device 28 to store, as a display frequency (%), a ratio of the cumulative time by language. For example, as shown in FIG. 3, the controller 31 calculates, by English, Japanese, French, and Spanish, the display frequency (%) of each of the languages, and causes the storage device 28 to store thereof. The controller 31 extracts the text from the print data, and, when determining that more than one kind of language is included in the text extracted, determines that a language, among the languages, whose display frequency is a predetermined fixed value or more is the language to be recorded. The controller 31 then causes the image forming device 12 to form the text of the determined language on the recording sheet.

This makes it possible to perform control in which an image of a certain language is formed and an image of other language is not formed; that is, when the text consisting of English, Japanese, French, and Spanish is included in the print data, it possible to perform control in which the text of English and the text of Japanese are image formed on the recording sheet, but the text of French and the text of Spanish are not image formed on the recording sheet.

The controller 31 determines the language to be recorded by using a condition that the language whose display frequency is the fixed value or more. Alternatively, in making the determination, a condition that the language whose display frequency is other than "0" may be used.

Hereafter describes a procedure for setting or not setting the language selection function. For example, suppose the controller 31 is causing the display device 21 to display an initial screen G1 shown in FIG. 4. On the initial screen G1, a plurality of function keys 51*a* to 51*h* respectively associated with different functions are displayed. When the user touches the function key 51*h* associated with the language selection function, the controller 31 receives through the touch panel 23 the touch operation performed on the function key 51*h*, and causes the display device 21 to display a selection screen G2 for the language selection function, shown in FIG. 5.

Figure 4:
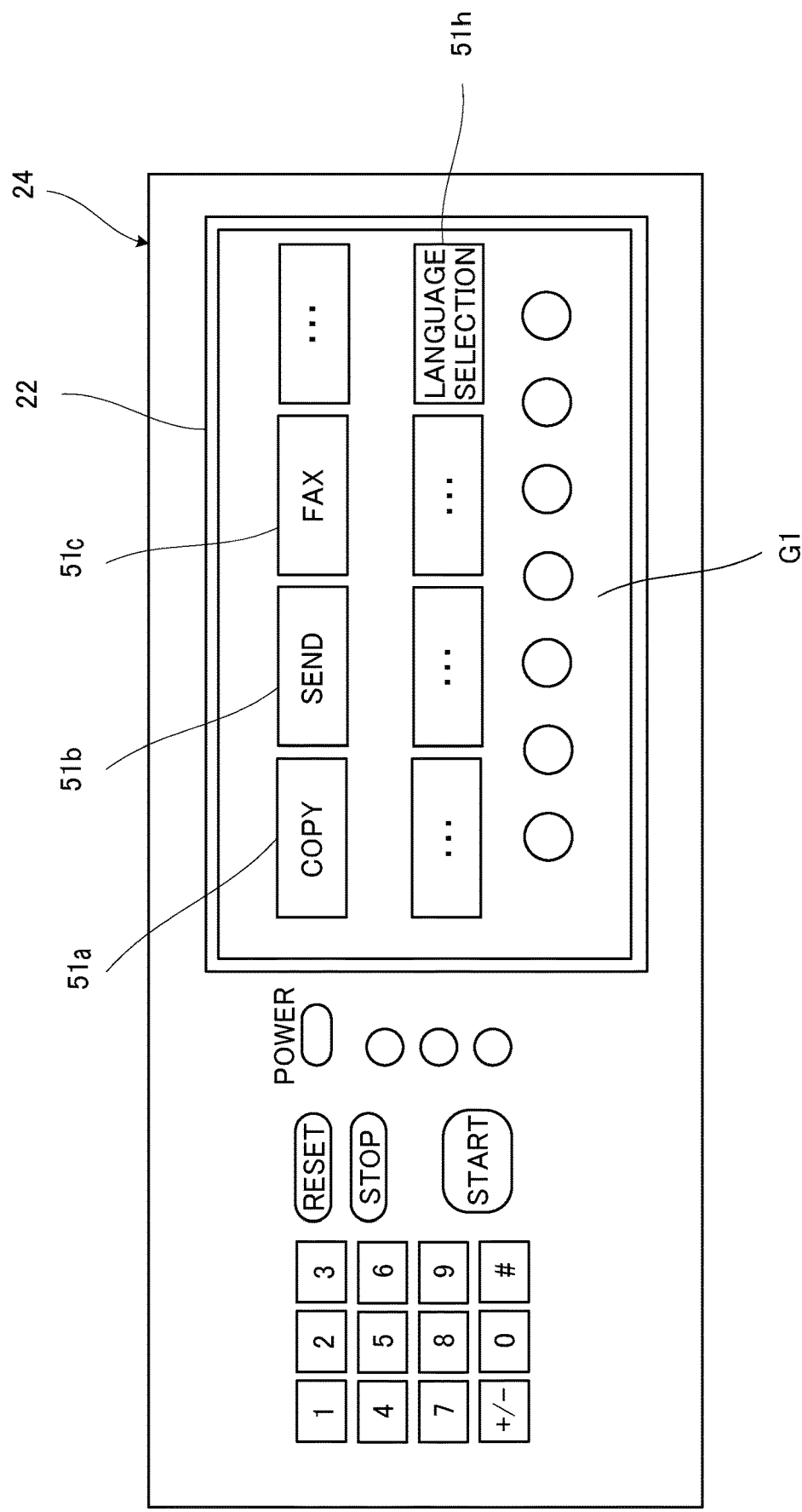
FIG. 4 is a diagram showing an initial screen displayed on a display device of the image forming apparatus.
Figure 5:
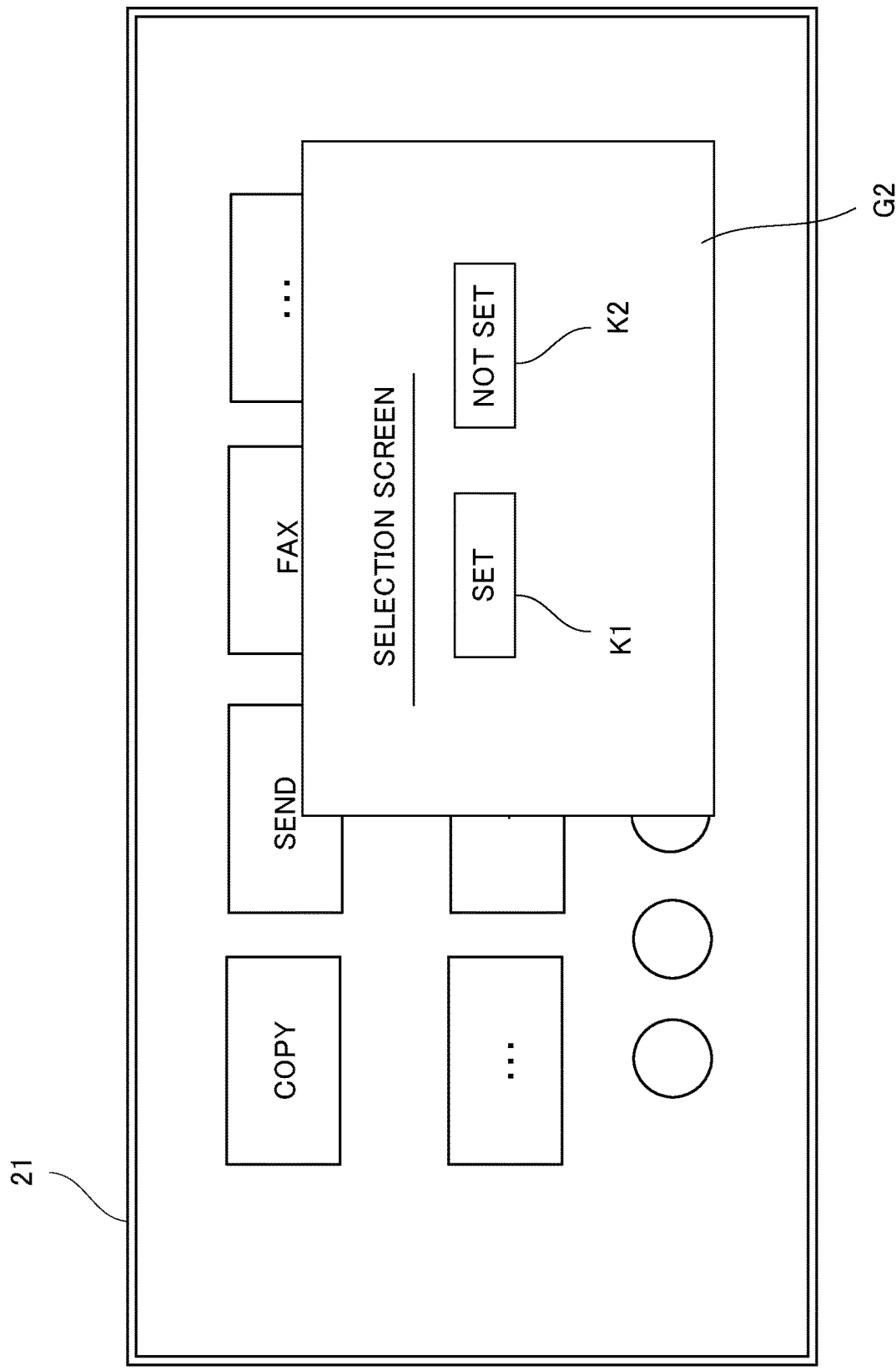
FIG. 5 is a diagram showing a selection screen displayed on the display device of the image forming apparatus.

On the selection screen G2 for the language selection function, a set key K1 for receiving an instruction to set the language selection function and a not-set key K2 for receiving an instruction not to set the language selection function are displayed. When the user touches the set key K1, the controller 31 receives through the touch panel 23 the instruction to set the language selection function, and sets the language selection function. When the user touches the not-set key K2, the controller 31 receives through the touch panel 23 the instruction not to set the language selection function, and does not set the language selection function. After the setting or the non-setting of the language selection function as described above, the controller 31 causes the display device 21 to re-display the initial screen G1, as shown in FIG. 4.

Figure 6:
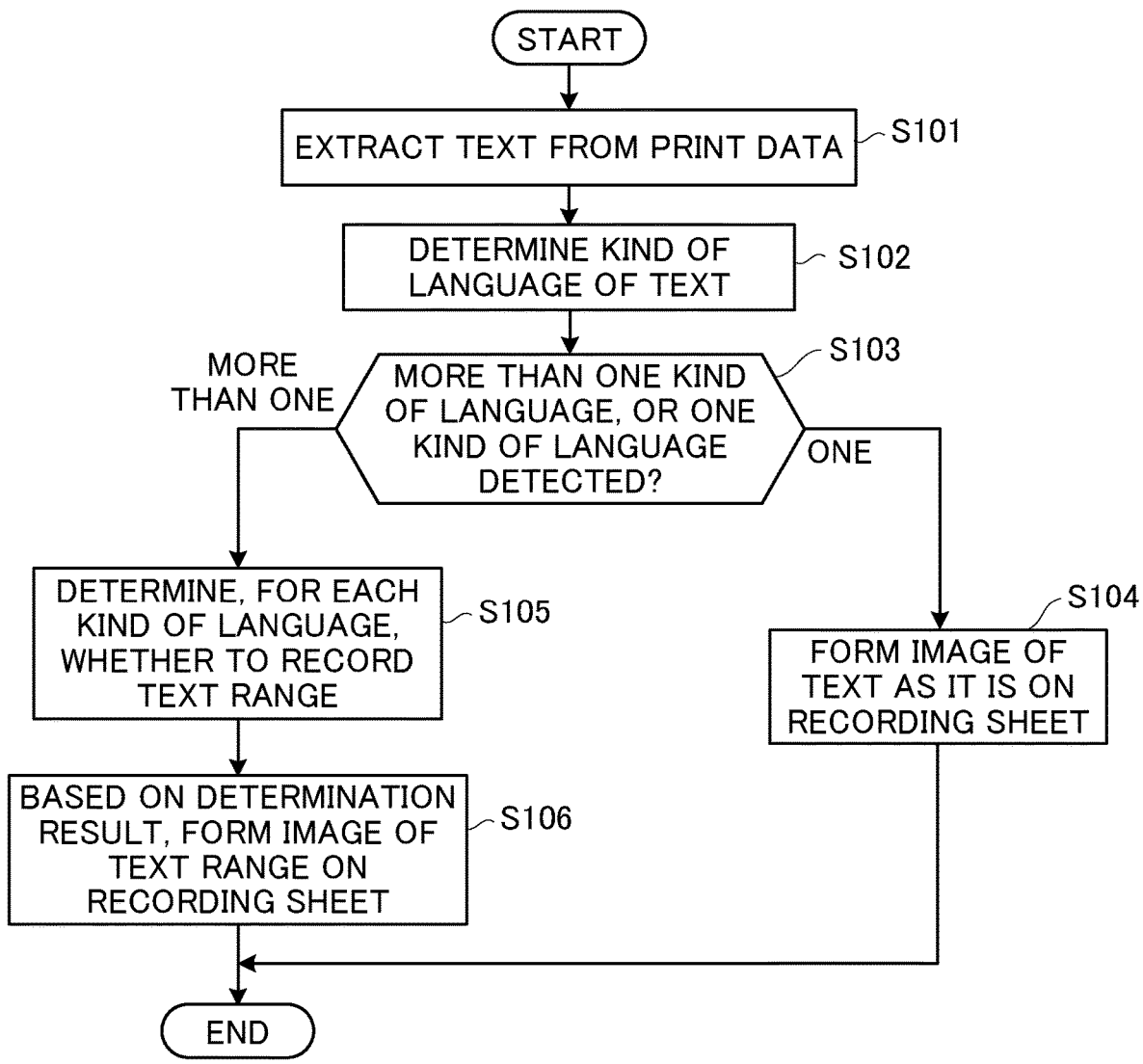
FIG. 6 is a flowchart showing language selection processing for selecting a language to be recorded on a recording sheet.

Hereafter describes the language selection processing with reference to, such as, a flowchart shown in FIG. 6; in the language selection processing, whether to record the text is determined for each kind of the language of the text extracted from the print data, and the text of the language determined to be recorded is formed on the recording sheet. It is assumed that the controller 31 has set the language selection mode.

Suppose that, as the print data, the image memory 26 stores: the image data indicating an image of a document read by the image reading device 11; the image data received by the facsimile communication device 25; or the data consisting of the page description language received by the network communication device 24 from an external computer. Since the language selection mode is being set, the controller 31 extracts the text from the print data stored in the image memory 26 (S101). For example, the controller 31 (i) recognizes characters included in the image indicated by the print data by using the aforementioned OCR function or (ii) determines the character codes included in the print data, to extract the text from the print data.

Then, the controller 31 determines the kind of the language of the text extracted (S102), and determines whether more than one kind of language is included in the text extracted (S103). For example, when determining that there is only one language is included ("ONE" at S103), the controller 31 causes the image forming device 12 to form the text and the image indicated by the print data (S104), without editing the text indicated by the print data. In this case, for example, the text (consisting of only one language), a picture, and a figure are image formed on the recording sheet.

When determining that more than one kind of language is included in the text ("MORE THAN ONE" at S103), the controller 31 extracts the text range for each kind of language, and furthermore, with reference to the display frequency (%) of each kind of the language (exemplified in FIG. 3), determines whether the display frequency of each of the languages is the fixed value or more (S105). The controller 31 then determines that the text range of the language whose display frequency is the fixed value or more is the text range to be recorded on the recording sheet (be a target for image formation), and also determines that the text range of the language whose display frequency is less than the fixed value is the text range not to be recorded on the recording sheet (S105).

The controller 31 leaves the text range determined as to be recorded on the recording sheet and also performs, on the print data, an editing of deleting the text range determined as not to be recorded on the recording sheet. The controller 31 then causes the image forming device 12 to image form on the recording sheet the text range and the image (photo, figure, and the like) left in the print data by this editing (S106). Here, only the text range is the target for the editing: the controller 31 does not perform the editing on the image (photo, figure, and the like).

Figure 7B:
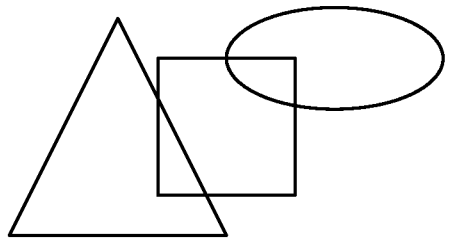
FIG. 7B is a view showing the recording sheet on which the text of English and the text of Japanese are left and formed, and the image is formed together.

Suppose, for example, the original print data is as shown in FIG. 7A, including text in English, Japanese, French, and Spanish, and also including an image, and the display frequencies of English and Japanese are the fixed value or more, while the display frequencies of French and Spanish are less than the fixed value. In this case, according to the above embodiment, the text of English and the text of Japanese are left and formed on the recording sheet and also the image is formed on the recording sheet, while the text of French and the text of Spanish are deleted, as shown in FIG. 7B. FIG. 7B exemplifies the case where the controller 31, in performing the aforesaid editing, performs processing of closing up the regions of the text of French and the text of Spanish, which is to be deleted, to arrange, to that regions, the image that follows.

As described thus far, in the present embodiment, when more than one kind of language is determined, whether to record the text range of the language is determined for each determined kind of the language, and the image forming device 12 is caused to image form, on the recording sheet, the text range of the language determined to be recorded.

Accordingly, it is possible to form and leave the image of the text range of the language of the kind assumed to be necessary for the user on the recording sheet, and to delete the text range of the language of other kind assumed to be unnecessary for the user.

Figure 8:
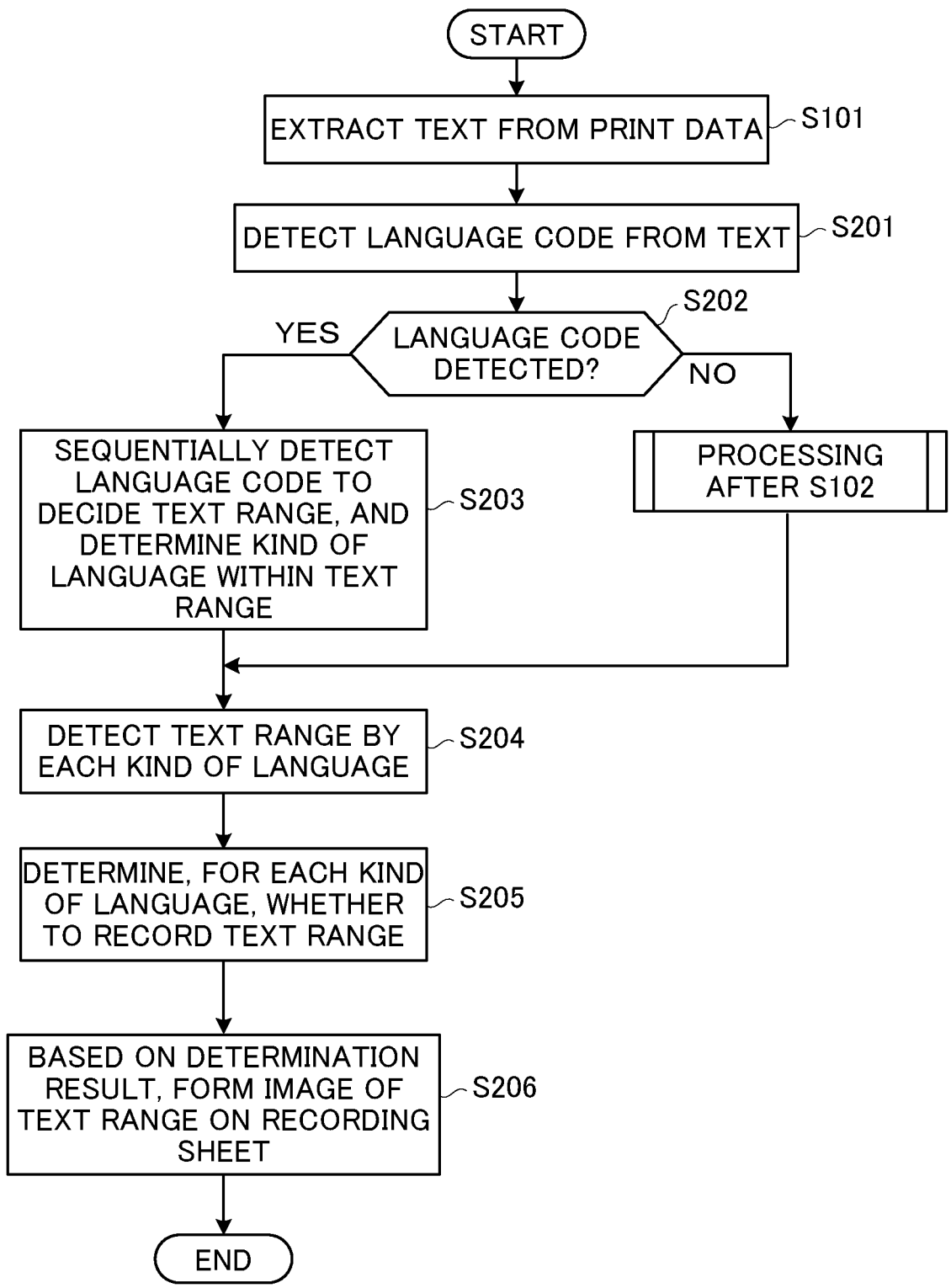
FIG. 8 is a flowchart showing the language selection processing in another embodiment.

Hereafter describes another embodiment of the language selection processing shown in FIG. 6 with reference to a flowchart shown in FIG. 8.

The controller 31 stores in the ROM each language code corresponding to each of the various kinds of language. Alternatively, the language codes may be stored in the storage device 28, and in this case, the controller 31 reads out the language code from the storage device 28. The controller 31 recognizes the characters included in the text extracted by the processing at S101 of FIG. 6 in series, and successively detects a character string that coincides with any of a preset language code from the predetermined position of the text (S201). Each language code includes "EN" for English, "JP" for Japanese, "FR" for French, and "ES" for Spanish. The aforesaid predetermined position is the display position of the language code set in advance with respect to the text.

For example, when detecting the character string that coincides with any of the language codes from the text (YES at S202), the controller 31 consecutively detects, in a layout order of the text, other character string that coincides with other language code from the text. The controller 31 detects the text range starting from a first detected language code and ending right before a next detected another language code and determines that the language included in that text range is the language corresponding to the first detected language code (S203). For example, when the controller 31 detects the language code "EN" from the text and after this detects the language code "JP" from the text, the controller 31 detects that the range from the language code "EN" to right before the language code "JP" is the text range, and determines that the language of this text range is English that corresponds to the language code "EN".

The controller 31 repeats such processing of S203 from the beginning to the end of the text extracted from the print data. Accordingly, the controller 31 repeats a series of processing of detecting the character string that coincides with any of the language codes from the text, detecting the text range starting from the first detected language code and ending right before the next detected another language code, and determining that the language of the text range is the language corresponding to the first detected language code. The controller 31 detects the text range by each kind of language in such the way (S204).

Then, with reference to the display frequency (%) of each kind of the language (exemplified in FIG. 3), the controller 31 determines whether the display frequency of each of the languages is the fixed value or more. The controller 31 then determines that the text range of the language whose display frequency is the fixed value or more is the text range to be recorded on the recording sheet, and also determines that the text range of the language whose display frequency is less than the fixed value is the text range not to be recorded on the recording sheet (S205).

Subsequently, the controller 31 performs, to the print data, the editing of leaving the text range determined to be recorded on the recording sheet and deleting the text range determined not to be recorded on the recording sheet, and causes the image forming device 12 to image form the text range left in the print data by this editing and the image (photo, figure, and the like) on the recording sheet (S206).

In failing to detect the character string that coincides with any of the language codes from the text (NO at S202), the controller 31 performs the processing after S102 of the language selection processing shown in FIG. 6.

According to another embodiment described above, it is possible to determine the text range assumed to be necessary and unnecessary for the user by the processing easier than the language selection processing shown in FIG. 6.

In a general technique, if text including more than one kind of language is indicated by print data, the text including all languages is entirely formed on the recording sheet. Thus, there occurs a problematic situation where the text that the user cannot understand or the text that is unneeded by the user is formed on the recording sheet. In addition, there is also a concern that the recording sheet and the toner are uselessly consumed. The generally used printer described in the background art above checks the character code to be printed in the page description language to detect an error. However, the generally used printer does not include the technique of recording and leaving the text of the language of the necessary kind on the recording sheet and deleting the text of other language of the unnecessary kind.

Unlike the above technique, when the text including more than one kind of language is indicated by the print data, the present embodiment is capable of selecting and image forming, on the recording sheet, the text of the language of the necessary kind, and capable of not-forming the image of the text of other language of the unnecessary kind. Thus, the present embodiment is capable of providing a printed matter with improved readability for the user.

<Modification 1>

According to a modification 1, as shown in FIG. 3, the controller 31 sets a priority level to each kind of the language in accordance with the display frequency (%) of each kind of the language and causes the storage device 28 to store the priority level. In other words, among the display frequency (%) of each kind of the language, the higher the display frequency (%), the higher the priority level is set. The determination of the text range to be recorded on the recording sheet performed at the step S105 of the language selection processing shown in FIG. 6 is performed as follows.

In image forming the print data, the controller 31 extracts the text from the print data, and, when determining that more than one kind of language is included in the text extracted, determines that, with reference to the priority level of each kind of the language, the text range of the language of the kind in the number predetermined in a decreasing order of the priority level is the text range to be recorded on the recording sheet, and causes the image forming device 12 to image form the text range on the recording sheet.

At this point, the controller 31 may be configured to control the image forming device 12 so that the higher the priority level, the higher print density in the text range.

<Modification 2>

According to a modification 2, in using the image forming apparatus 10, the user operates the operating device 22 or the touch panel 23 to input his or her own identification information, and the controller 31 approves the user identification information as authorized identification information, and permits the use of the image forming apparatus 10 (accepts the user's login). During the use of the image forming apparatus 10 by the user, the controller 31 calculates, for each kind of the language of the GUI being caused to be displayed on the display unit 21, a cumulative time of the displaying: the controller 31 uses, as the display frequency of each kind of the language, a ratio of the cumulative time of each kind of the language to total time of cumulative time of all of the languages. The controller 31 causes the storage device 28 to store the display frequency of each of the languages in association with the user identification information. That is, the controller 31 calculates the display frequency of each of the languages for each piece of the user identification information, and causes the storage device 28 to store the display frequency.

The determination of the text range to be recorded on the recording sheet performed at the step S105 in the language selection processing (shown in FIG. 6) is made as follows.

When the print data is image formed in a condition where the user identification information inputted through the operation of the operating device 22 or the touch panel 23 is approved and the use of the image forming apparatus 10 is allowed, the controller 31 extracts the text from the print data, and determines that more than one kind of language is included in the text extracted. When determining that more than one kind of language is included in the text extracted, the controller 31 reads out and makes reference to the display frequency of each kind of the language associated with the user identification information from the storage device 28, and determines that the language whose display frequency is the predetermined fixed value or more is to be recorded. The controller 31 causes the image forming device 12 to image form, on the recording sheet, the text range including the language determined to be recorded. The controller 31 also determines not to record the language whose display frequency is less than the fixed value and does not cause the image forming device 12 to image form, on the recording sheet, the text range including that determined kind of the language. Alternatively, the controller 31 may determine that, with reference to the priority level of each kind of the language associated with the user identification information, the text range of the language of the kind in the number predetermined in the decreasing order of the priority level is the text range to be recorded on the recording sheet, and causes the image forming device 12 to image form the text range on the recording sheet, while causing the image forming device 12 not to image form the text range including other languages. This makes it possible to determine for each user whether each of the languages is often used language or not, and only the text range including the languages that are frequently used by the user operating the image forming apparatus 10 can be image formed on the recording sheet.

<Modification 3>

According to a modification 3, by each kind of language, the controller 31 calculates an image formation frequency of the language to be image formed on the recording sheet, and causes the storage device 28 to store the image formation frequency. The determination of the text range to be recorded on the recording sheet performed at the step S105 of the language selection processing shown in FIG. 6 is performed as follows.

Based on the image formation frequency of each kind of the language, the controller 31 determines, for each kind of the language determined at the step S102 of FIG. 6, whether the text range of the determined language is to be the text range to be recorded.

For example, for each kind of language, the controller 31 calculates the number of recording sheets on which the text range is image formed, and calculates, as the image formation frequency (%) of each of the languages, a ratio of each of the recording sheets including each kind of language to the total number of the recording sheets in all of the languages. As FIG. 9 shows an example, the controller 31 causes the storage device 28 to store the image formation frequency (%) by language.

Then, in image forming the print data, the controller 31 extracts the text from the print data (S101 of FIG. 6), and, when determining that more than one kind of language is included in the text extracted (S102 and S103 of FIG. 6), determines that the text range whose image formation frequency is the predetermined fixed value or more is the text range to be recorded on the recording sheet (S105 of FIG. 6), and causes the image forming device 12 to image form the text range on the recording sheet (S106 of FIG. 6).

Alternatively, the controller 31 may perform a setting where the higher the image formation frequency (%) of each kind of the language, the higher the priority level in each of the languages corresponding to the image formation frequency (%), and may cause the image forming device 12 to image form, on the recording sheet, the text range of the language of the kind in the number predetermined in the decreasing order of the priority level.

Also in the modification 3, similar to the modification 2, the image formation frequency of each kind of the language is caused to be stored in the storage device 28 for each piece of the user identification information, and based on the image formation frequency of each kind of the language for each piece of identification information of the user who has logged into the image forming apparatus 10, it may be configured to determine, by each piece of the identification information, whether the text range including each kind of the language is to be recorded.

<Modification 4>

According to a modification 4, (1) when not approving the user identification information, the controller 31 causes the storage device 28 to store the display frequency of each kind of the language (may be the image formation frequency: the same applies below) as the display frequency of the entire image forming apparatus 10 (total of all users). Furthermore, according to the modification 4, (2) when approving the user identification information, the controller 31 causes, similar to the modification 2, the storage device 28 to store the display frequency of each kind of the language (may be the image formation frequency: the same applies below) in association with the user identification information.

The determination of the text range to be recorded on the recording sheet performed at the step S105 of the language selection processing shown in FIG. 6 is performed as follows.

Figure 10:
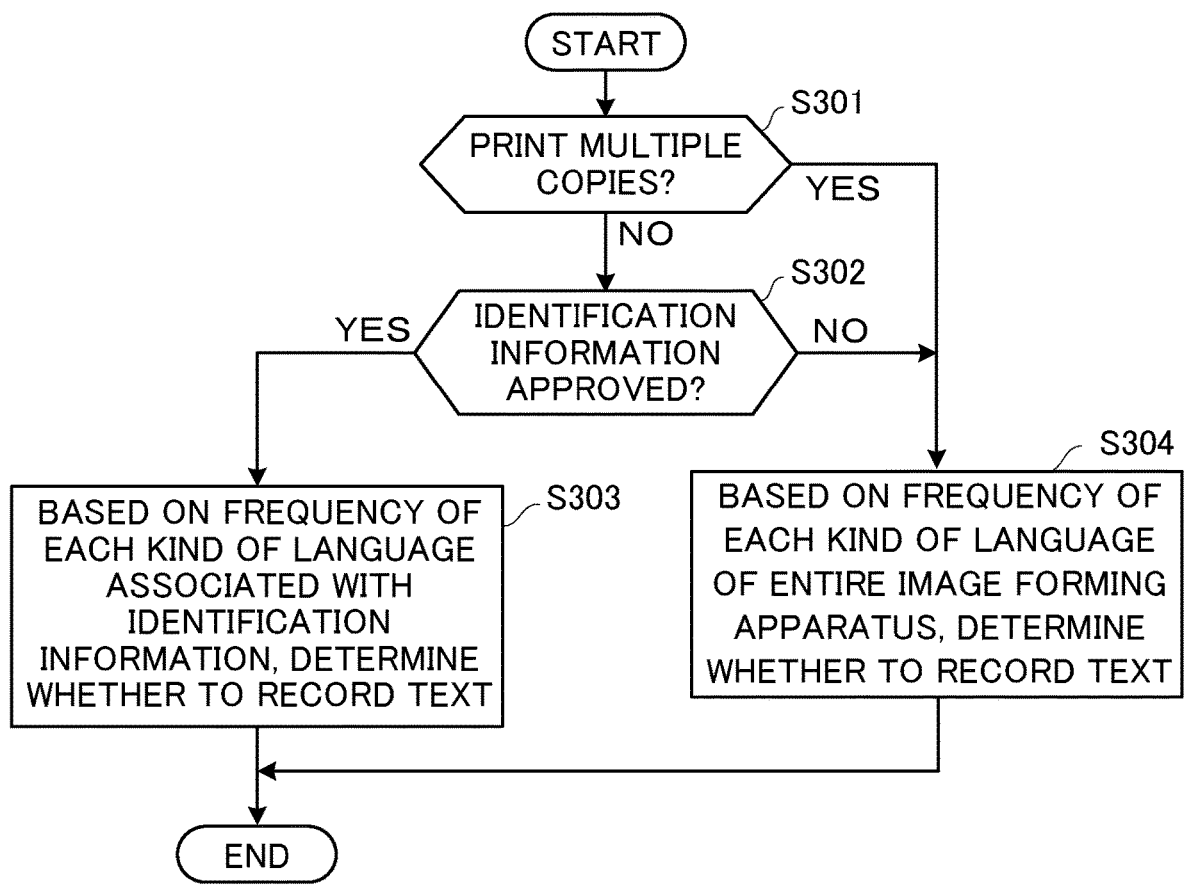
FIG. 10 is a flowchart showing determination processing of determining a text range to be recorded on the recording sheet in another embodiment.

FIG. 10 is a flowchart showing determination processing of determining the text range to be recorded on the recording sheet in the modification 4. At first, the controller 31 determines whether printing of multiple copies is instructed (S301). When the printing of multiple copies is not instructed (NO at S301), that is, the printing instruction is only for one copy, in approving the user of the image forming apparatus 10, the controller 31 determines whether the user identification information is approved (S302). When the user identification information is approved (YES at S302), similar to the case of the modification 2, based on the display frequency of each kind of the language associated with the user identification information, the controller 31 determines whether the text range is to be recorded on the recording sheet, for each determined kind of the language (S303).

When the printing of multiple copies is instructed (YES at S301) or the printing of multiple copies is not instructed (NO at S301) and the user identification information is not approved (NO at S302), for each determined kind of the language, based on the display frequency of each kind of the language of the entire image forming apparatus 10, the controller 31 determines whether the text range is to be recorded on the recording sheet (S304), in this case similar to the step S105 of FIG. 6.

When multiple copies are to be printed, it is predicted that the same printed matter will be distributed to a plurality of persons. In such a case, the language that is easy to understand for the persons receiving the distribution of the printed matter is not necessarily the same as the language that is easy for the user who logged into the image forming apparatus 10 and printed the printed matter. Thus, when the determination as to whether the text range of each of the languages is to be recorded is made based on the display frequency of all users who use the image forming apparatus 10, it is more expectable that the text range including the easy-to-understand language for persons who take a look at the printed matter will be image formed. On the other hand, when the user logs in to the image forming apparatus 10 and only a single copy is to be printed, there is a high possibility that it is the user who takes look at this printed matter. Therefore, when the determination as to whether the text range of each of the languages is to be recorded is made based on the display frequency associated with the user identification information, it is more expectable that the text range including the easy-to-understand language for the person who takes a look at the printed matter will be image formed.

By properly using the display frequency of each kind of the language of the entire image forming apparatus 10 and the display frequency of each kind of the language associated with the user identification information as this way, it is possible to choose the language exactly so that the text range including easy-to-understand language for persons who take a look at the printed matter is image formed, and, the text range including this selected language can be image formed on the recording sheet.

<Modification 5>

According to a modification 5, the user operates the operating device 22 or the touch panel 23 to select and instruct that an arbitrary language among each of the languages is the language to be recorded without fail. For example, as shown in FIG. 11, the controller 31 causes the storage device 28 to store the display frequency of each of the languages, the priority level, and that the instructed arbitrary language is to be recorded without fail.

Then, the determination of the text range to be recorded on the recording sheet performed at the step S105 of the language selection processing shown in FIG. 6 is performed as above, and furthermore, as for the text range of the arbitrary language, it is always determined as the text range to be recorded on the recording sheet. Thus, the text range of the user's desired language is image formed without fail.

The present disclosure is not limited to the image forming apparatus of the above embodiment and may be applied to other apparatuses such as a copier, a printer, and a facsimile machine.

The structure and configuration of the above embodiment described with reference to FIGS. 1 to 11 are merely illustrative of the present disclosure and not intended to limit the present disclosure to the above particular structure and configuration.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image forming device that forms an image indicated by print data on a recording sheet; and
   a control device that includes a processor and functions, through the processor executing a control program, as a controller configured to: extract text contained in the print data to determine a kind of a language of the text extracted; determine, for each determined kind of the language, whether to record the text consisting of the language of the determined kind; and when it is determined that the text is to be recorded, cause the image forming device to image form the text consisting of the language of the determined kind on the recording sheet, and, when it is determined that the text is not to be recorded, not to cause the image forming device to image form the text consisting of the language of the determined kind on the recording sheet.

2. The image forming apparatus according to claim 1, wherein the controller stores predetermined language codes respectively corresponding to various kinds of language, sequentially detects each of the language codes from the text extracted, and determines that the kind of the language within a text range starting from a first detected language code and ending right before a next detected another language code is the kind of the language corresponding to the first detected language code.

3. The image forming apparatus according to claim 1, further comprising:
   a storage device; and
   a display device on which a graphical user interface is displayed,
   wherein the controller causes the display device to display a plurality of the graphical user interface respectively shown in various kinds of language, respectively calculates a display frequency of each kind of the language displayed as the graphical user interface, causes the storage device to store the display frequency, and determines, based on the display frequency corresponding to the determined kind of the language, whether to record the text consisting of the language of the determined kind.

4. The image forming apparatus according to claim 3, wherein in a condition where user identification information is approved and a user thereof is logged in to the image forming apparatus, when calculating the display frequency of each kind of the language displayed as the graphical user interface, the controller causes the storage device to store the display frequency of each kind of the language in association with the user identification information, and in a condition where the user identification information is approved and the user is allowed to log in, when causing the image forming device to image form the image indicated by the print data, the controller determines, based on the display frequency of each kind of the language associated with the user identification information, whether to record the text consisting of the language of the determined kind.

5. The image forming apparatus according to claim 3, wherein the controller sets, in accordance with the display frequency of each kind of the language, a priority level to each kind of the language and causes the storage device to store the priority level, and, when extracting the text contained in the print data and determining that the various kinds of language are included in the text extracted, the controller determines that, with reference to the priority level of each kind of the language stored in the storage device, a text range of the language of the kind in the number predetermined in a decreasing order of the priority level is a text range to be recorded on the recording sheet, and causes the image forming device to image form the text range on the recording sheet.

6. The image forming apparatus according to claim 5, wherein the controller causes the image forming device to image form the text range on the recording sheet in such a way that print density is higher as the priority level becomes higher.

7. The image forming apparatus according to claim 1, further comprising a storage device,
wherein the controller calculates an image formation frequency of forming an image of each kind of the language on the recording sheet and causes the storage device to store the image formation frequency, and determines, based on the image formation frequency of the determined language, whether to record the text consisting of the language of the determined kind.

8. The image forming apparatus according to claim 7, wherein in a condition where user identification information is approved and a user thereof is logged in to the image forming apparatus, when calculating the image formation frequency of forming the image of each kind of the language on the recording sheet, the controller causes the storage device to store the image formation frequency of forming the image of each kind of the language on the recording sheet in association with the user identification information, and in a condition where the user identification information is approved and the user is allowed to log in, when causing the image forming device to image form the image indicated by the print data, the controller determines, based on the image formation frequency of each kind of the language associated with the user identification information, whether to record the text consisting of the language of the determined kind.

9. The image forming apparatus according to claim 1, further comprising an operating device to be operated by a user,
wherein in making the determination as to the text of which kind of the language is to be recorded, the controller determines, as for the kind of the language chosen that the recording is necessary, to record the text of the kind thereof.

\* \* \* \* \*